(12) United States Patent
Mathsen et al.

(10) Patent No.: US 9,040,289 B2
(45) Date of Patent: May 26, 2015

(54) GRAVITY ASSISTED COMPOST REACTOR

(75) Inventors: Don V. Mathsen, Grand Forks, ND (US); Calvin R. Tininenko, Grand Forks, ND (US); Rodney J. Kleven, Bismarck, ND (US); Evan P. Andrist, Grand Forks, ND (US)

(73) Assignee: BacTee Systems, Inc., Grand Forks, ND (US)

( * ) Notice: Subject to any disclaimer, the term of this patent is extended or adjusted under 35 U.S.C. 154(b) by 535 days.

(21) Appl. No.: 13/555,709

(22) Filed: Jul. 23, 2012

(65) Prior Publication Data

US 2014/0024109 A1  Jan. 23, 2014

(51) Int. Cl.
*C12M 1/02* (2006.01)
*C05F 17/02* (2006.01)
*B65G 65/23* (2006.01)

(52) U.S. Cl.
CPC ......... *C05F 17/0294* (2013.01); *C05F 17/0247* (2013.01); *C05F 17/0264* (2013.01); *B65G 65/23* (2013.01)

(58) Field of Classification Search
CPC .. C05F 17/01; C05F 17/0211; C05F 17/0217; C05F 17/0247; C05F 17/0258
USPC ........... 435/289.1, 290.1, 290.2, 290.4, 293.1
See application file for complete search history.

(56) References Cited

U.S. PATENT DOCUMENTS

| | | | | |
|---|---|---|---|---|
| 4,468,128 A * | 8/1984 | Cobey | ........................ | 366/156.2 |
| 4,954,039 A * | 9/1990 | Johnston et al. | ............... | 414/500 |
| 4,975,019 A * | 12/1990 | Cate et al. | ...................... | 414/812 |
| 5,661,031 A * | 8/1997 | Murphy et al. | ............ | 435/290.3 |
| 5,848,869 A * | 12/1998 | Slocum et al. | ................ | 414/500 |
| 5,890,664 A * | 4/1999 | Conant, III | ...................... | 241/33 |
| 6,783,975 B2 * | 8/2004 | Windle | ........................ | 435/290.3 |
| 7,044,826 B2 * | 5/2006 | Edwards | ........................ | 446/428 |

* cited by examiner

*Primary Examiner* — Jill Warden
*Assistant Examiner* — Dwayne K Handy
(74) *Attorney, Agent, or Firm* — Dennis L. Thomte; Thomte Patent Law Office LLC

(57) ABSTRACT

A composting system is provided that uses gravity and natural thermal convection to yield a compact, modular, plug-flow compost reactor requiring minimal aeration and agitation energy. The compost reaction takes place in a self-supporting containment unit which is mounted at an angle with respect to its supporting base pad such that minimal external energy is required to mix and transport the composting material during its residence time within the container. The system uses natural convection to supplement external energy in the introduction of air into and through the material. Furthermore, the configuration of the containment unit and its supporting structures allow rapid deployment of compost facilities with minimal permanent civil work and minimal space requirements in a manner that enables subsequent relocation of the equipment.

14 Claims, 13 Drawing Sheets

GRAVITY ASSISTED COMPOST REACTOR

BACKGROUND OF THE INVENTION

1. Field of the Invention

This invention relates to a composting system and more particularly to a composting system which utilizes gravity and natural thermal convection to provide a compact, modular, plug-flow compost reactor which requires minimal aeration and agitation energy.

2. Description of the Related Art

Commercial compost facilities currently employ processes such as mechanically-turned windrows, aerated static piles (covered and uncovered), rotary drum reactors, agitated tunnel configurations, and various in-vessel systems. In some cases, two or more of these processes are combined in a sequence to achieve optimal composting conditions and the highest level of biological stability in the final product.

Mechanically-turned windrow systems employ a mechanical agitation device that is propelled through the composting material usually formed into a windrow of trapezoidal or triangular cross section. The mechanical agitation serves to introduce oxygen into the pile and also increase exposure of material to biological activity through the mechanical disruption of undigested material. Historically, the principal advantages of this system were the low capital equipment cost and minimal site preparation requirements. Time has shown that the disadvantages of this system are 1) long residence or process times to achieve biological stability, 2) lack of distributed temperature and oxygen uniformity through the material, 3) lack of odor control, and 4) negative process impacts from environmental conditions such as daily/seasonal ambient temperature and humidity swings and precipitation events. The lack of odor control has resulted in the closure of more compost facilities than any other cause.

Aerated static pile processes have been employed with the process material (1) directly exposed to the atmosphere, (2) protected from the atmosphere by either impermeable or semi-permeable membranes placed directly over the material, or (3) operated under enclosures. Aerated static pile processes rely on the forced movement of air through the process material to maintain adequate temperature and oxygen conditions while using minimal mechanical agitation of the material. Advantages of this system compared to mechanically-turned windrows include (1) a smaller footprint, (2) a higher level of control over temperature, moisture, and oxygen conditions, (3) somewhat shorter processing times, (4) reduction in the frequency of odor releases and intensity and (5) generally lower labor requirements. Disadvantages include (1) less than optimal exposure of the material surface to biological degradation and (2) pockets of minimally decomposed material due to the lack of sufficient agitation. Uncovered aerated static piles are subject to undesirable odor releases and facilities employing covered piles have had odor problems during periods when unprocessed and processed materials have been uncovered for agitation or during movement of the composting material to the next phase of the process.

The rotary drum systems generally have considerably higher equipment costs than either the agitated windrow or aerated static pile processes due to the need for large reactor vessels and accompanying structural support requirements. Because of the high equipment costs, rotary drum systems are usually designed for minimal material residence times to accommodate only the thermophilic compost stage. Therefore, rotary drum systems usually require deployment of a secondary compost process such as an agitated windrow, agitated tunnel, or aerated static pile to achieve acceptable stability levels.

Agitated tunnel systems use a mechanical agitator to periodically turn and transport the process material along the length of the tunnel throughout the compost process. Forced aeration of the material is usually incorporated into the tunnel floor to maintain active control over temperature and oxygen conditions during the process. The agitated tunnel system is particularly adaptable to large commercial facilities as it minimizes the overall footprint and is very adaptable to a high level of process control in either partially- or fully-automated facilities. It is also well suited to a variety of sites as it can be readily enclosed, if necessary, in harsh climates. Disadvantages of the agitated tunnel system include the amount and precision of the civil work required to support and construct the tunnels and the material handling equipment, particularly in enclosed, automated facilities.

Furthermore, the initial cost and on-going maintenance requirements of the agitator and other material handling equipment often discourage investment in these systems. External energy requirements, either electrical or thermal, can become a significant cost factor, particularly in cold climates.

In-vessel systems define any compost process that uses a special containment unit to create and maintain the ideal environment for the biological degradation of organic materials. In-vessel systems typically monitor and control temperature, oxygen, and sometimes humidity or moisture levels within the containment unit thus creating the conditions for rapid microbial digestion of organic materials. This optimization of process conditions minimizes the processing time required for stabilization of the material. By their very nature, in-vessel systems are typically batch processes and most are not well suited for automation of the material handling requirements. Only a few in-vessel systems incorporate a means of agitation without total removal and replacement of the material at some point during the process cycle. In-vessel systems are more adaptable to small or mid-sized compost facilities.

In many situations, the selection of a compost process is also dictated by the available space; therefore, minimizing the footprint of an installation becomes a critical siting factor. In some cases, a compost facility is only required temporarily at a given site and is subsequently moved; therefore, portability of the equipment is a desirable characteristic.

Accordingly, there is a need for a novel compost system and method that offers a plug flow compost process while incorporating the beneficial aeration, agitation, and process control features found only selectively among other compost systems but in a modular form that requires only minimal footprint, operator attention, external energy and civil work

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

This invention consists of a composting system that uses gravity to aid in the movement of process material through the requisite stages of an aerobic composting process. FIG. 5 provides an overview of a single modular unit in its functioning position.

The gravity assisted reactor of this invention is an in-vessel compost process that operates at a sufficient angle with respect to the horizontal to enable gravity to move the process material downwardly from the fill end of the vessel through the discharge end of the vessel. Within the vessel, a series of rotors both control the rate of flow along the length of the vessel and agitate the material as the material slides along the bottom surface of the vessel from the fill end to the discharge end thereof.

The individual gravity assisted reactor of this invention consists of the following components or substructures:

(1) A container having two opposing open ends, that houses the composting material throughout the residence time of the process;

(2) A structural stand for selectively adjusting the angle of the compost reactor that enables the positioning, elevation, securing, and lowering of the container with minimal energy and external equipment;

(3) Multiple rotor units vertically stacked in multiple positions to actuate, control, and prevent the flow of material from the fill to the discharge end of the vessel;

(4) A container hood that retracts to alternately expose and close the open end of the container in which material is placed to initiate the process;

(5) A discharge door that operates on a linkage that allows it to alternately expose or close the open end of the container from which the material is discharged at the end of the process;

(6) Multiple drive units, either electrical or hydraulic, that retract and close the container hood and discharge door and operate the rotors.

A typical composting facility employing the gravity assisted reactor could consist of multiple reactor units located immediately adjacent to each other.

As the process air leaves the top of the container cover, it is collected in a process air exhaust duct (manifold) through which the air travels to the odor blower and subsequently to an odor control device such as a biofilter. Since the exhausted air can be at a temperature exceeding the desirable upper temperature limit for entrance into a biofilter, a fresh (ambient) air inlet port is located at a point in the process air exhaust duct just downstream of a point where all process reactor exhaust air has entered the manifold. With the introduction of ambient air that is significantly cooler than the process exhaust air, the moisture in the process air exhaust stream will condense and must be removed from the system prior to entering the odor control blower. The down-coming process air exhaust duct provides an ideal configuration for forming and removing the condensate. A condensate drain line is positioned at the base of the process air exhaust duct at a point just upstream of the odor control blower. The condensate drain line transports the condensate to a central collection, disposal, or treatment location on the site.

The multiple reactor system or facility consists of multiple stands supported on foundation pads or other supports appropriate to the ground conditions at the site. Adjacent reactor units are mutually supported by vertical stand elements common to the adjacent reactor units. Filling of the reactor units may be accomplished by a variety of means. A 'fill conveyor' system with a slider bed distribution conveyor is shown as one means of automating the filling of each reactor unit. Likewise, one means of removing material from the discharge end of the container is a discharge conveyor that receives material from all reactor units for subsequent transport to a curing pile or directly to a mobile material handling unit (i.e. truck, trailer, front end loader, etc.).

In a multiple reactor system, process air is exhausted through the top of the container under the positive or negative pressure created by an odor control blower. Fresh air is drawn into each reactor through a screened fresh air inlet port at the base of the supply air manifold on each reactor unit. Any water (i.e., leachate) that is drained or produced from the biological action of the process material flows by gravity from the base of each aeration zone and is transported by the supply air manifold down to the base of the reactor. In a multiple reactor unit, the leachate is collected in a common manifold and transported to a central collection, disposal, or treatment location on the site.

The principal object of the invention is to provide an improved compost reactor.

A further object of the invention is to provide a gravity assisted compost reactor.

A further object of the invention is to provide a composting system which utilizes gravity and natural thermal convection to provide a compact, modular, plug-flow compost reactor which requires minimal aeration and agitation energy.

A further object of the invention is to provide a gravity assisted reactor which is produced and delivered to the site as a ready to install modular unit.

A further object of the invention is to provide a gravity assisted reactor which may be used in a side-by-side relationship with other like reactors.

A further object of the invention is to provide a compost reactor which may be quickly installed and readily expanded.

A further object of the invention is to provide a compost reactor which significantly reduces the overall footprint of a compost facility compared to other composting systems.

A further object of the invention is to provide a compost facility comprised of gravity assisted reactor units which are constructed with minimal site infrastructure requirements.

A further object of the invention is to provide a compost reactor which utilizes gravity in transporting the processed material downwardly through the container.

A further object of the invention is to provide a compost reactor which includes agitation rotors.

Yet another object of the invention is to provide a compost reactor, the angle of which may be easily and conveniently varied.

Still another object of the invention is to provide a compost reactor wherein a thermal profile will exist in which the highest temperature zone is at the top of the container followed by a profile of reduced temperatures upon the downward slope of the container.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 2:
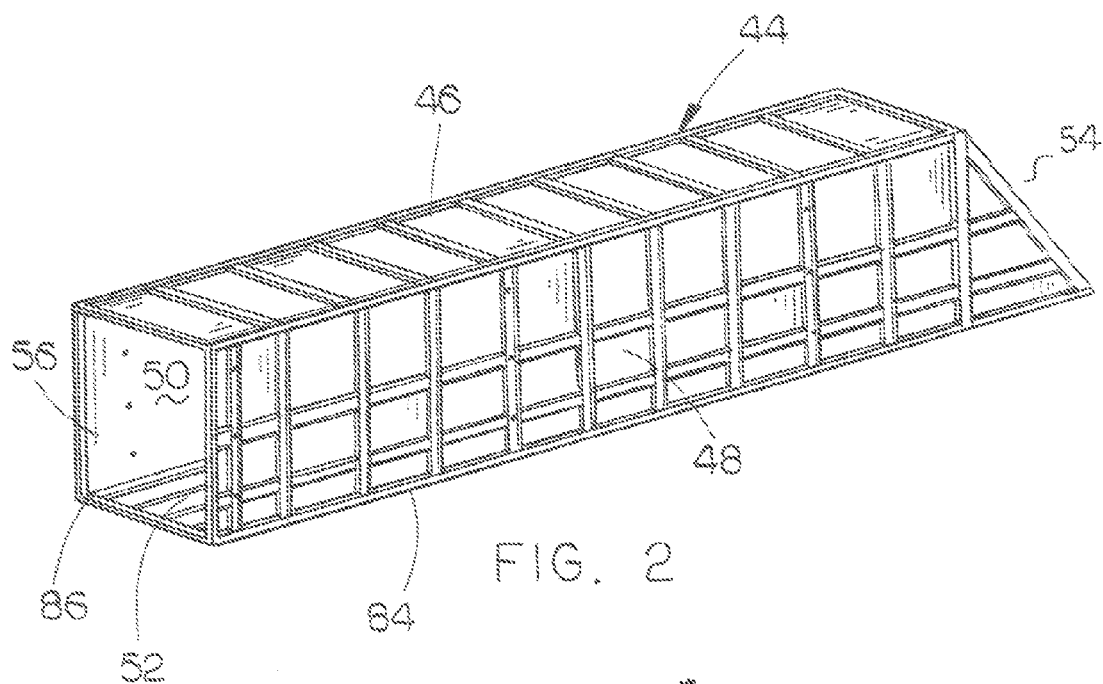
FIG. 2 is a perspective view of the container portion of the reactor of this invention without the hood and discharge door thereon.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The gravity assisted compost reactor of this invention is referred to generally by the reference numeral 10. The reactor 10 is designed so as to be transportable between composting locations. To that end, the numeral 12 refers to the frame of a truck or trailer which has a forward end 14 and a rearward end 16 for transporting the reactor 10 thereon from one composting location to another composting location. At the composting location, the truck or trailer is maneuvered so that the reactor 10 may be removed from the frame 12 and positioned on a structural stand 18 which is positioned on a support structure 20. At that time, the truck or trailer may be removed from the composting location if so desired.

Figure 3:
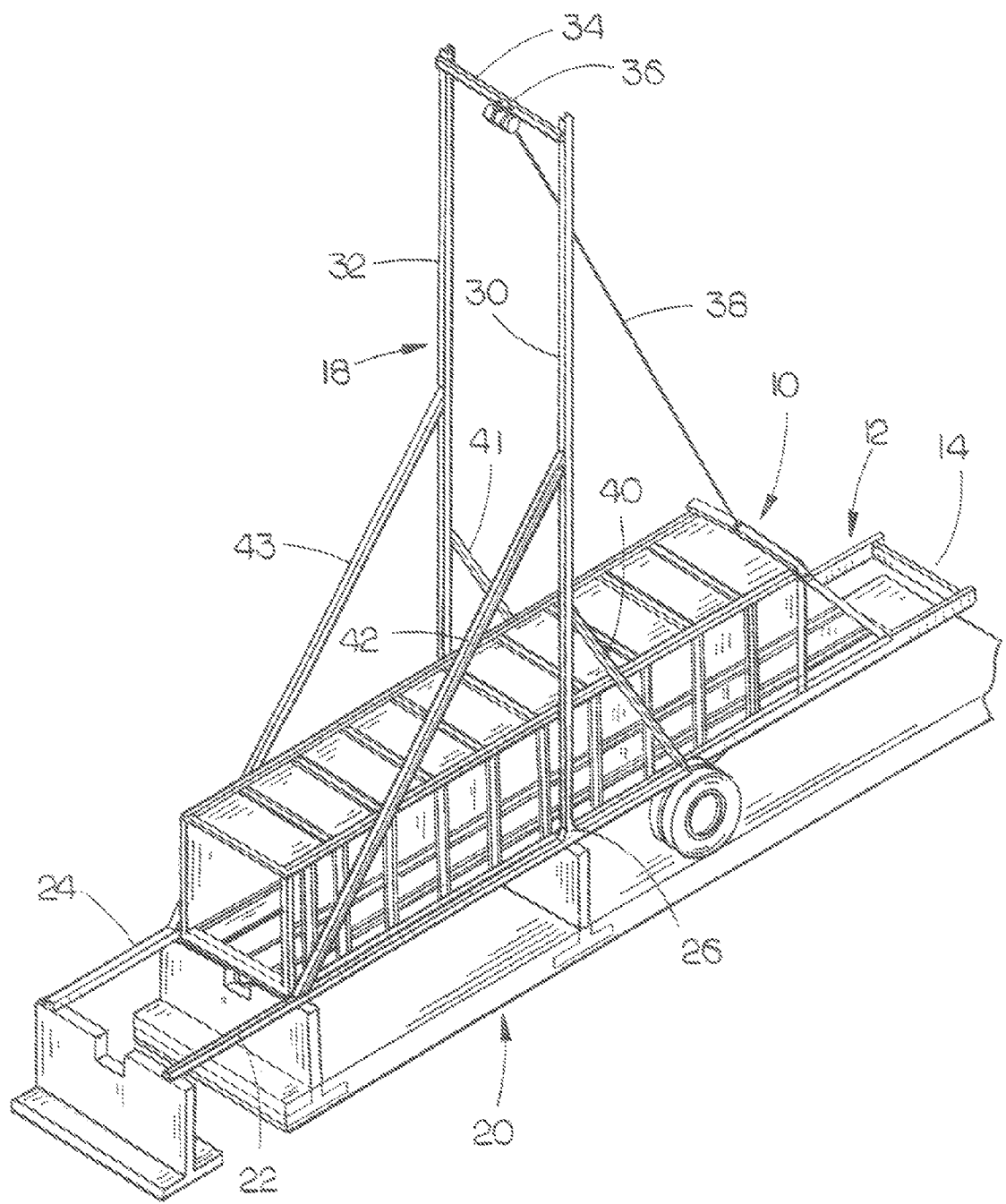
FIG. 3 is a perspective view illustrating the container moved onto the structural stand from its transport vehicle of truck or trailer prior to the container being raised to its operative position.
Figure 4:
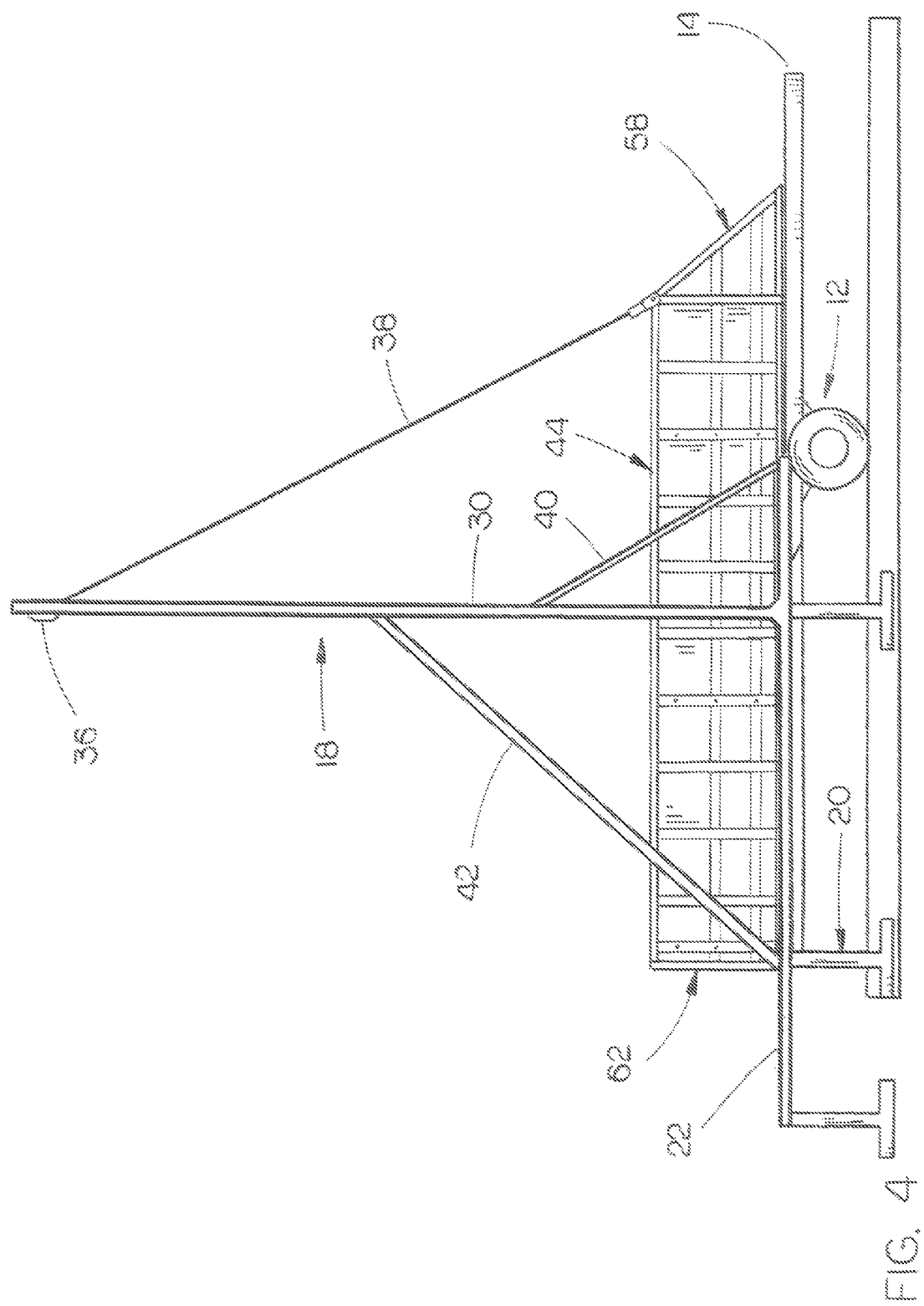
FIG. 4 is a side view of the reactor prior to the container portion thereof being raised to its operative position.
Figure 5:
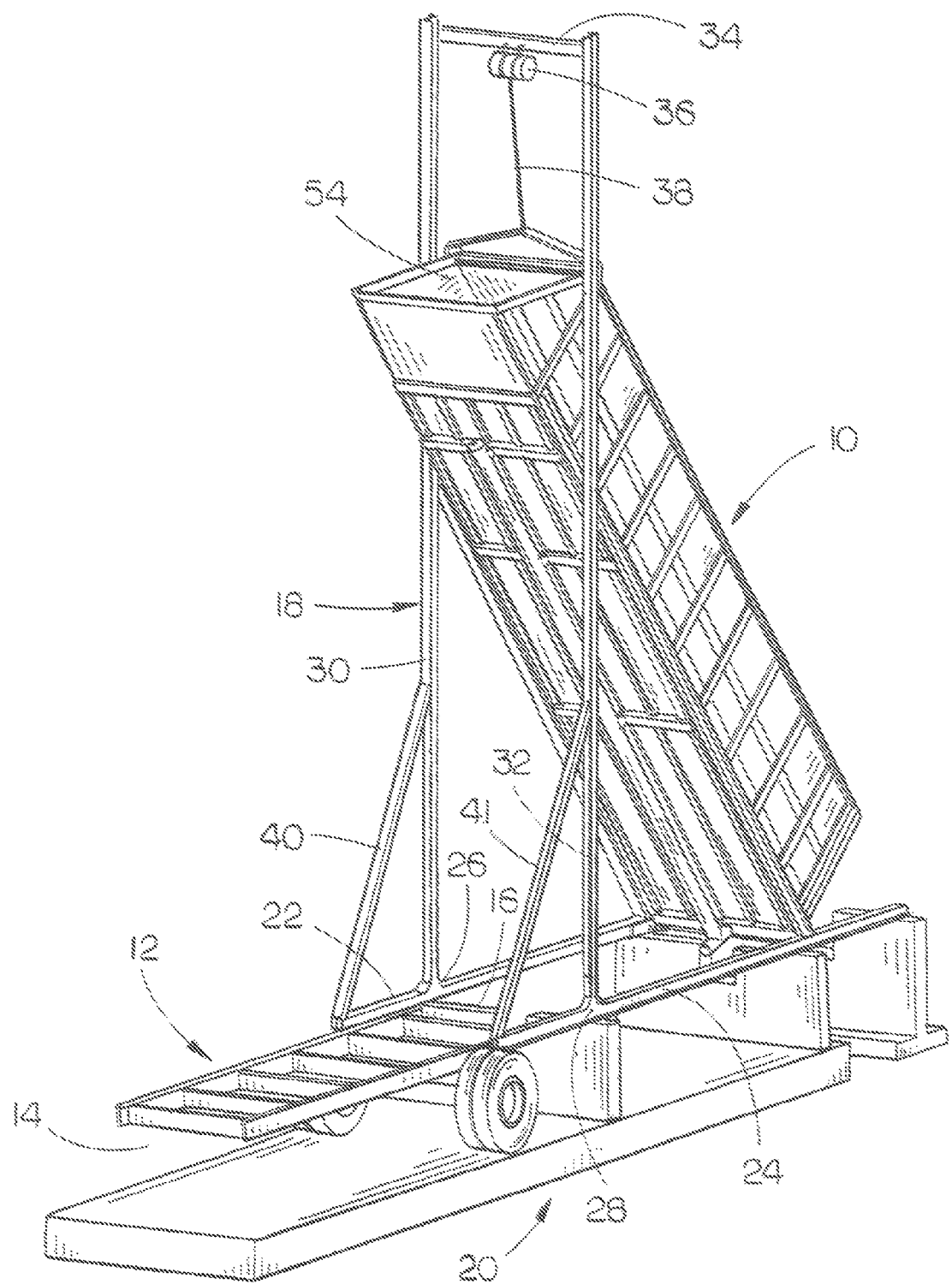
FIG. 5 is a perspective view of the reactor with the container portion thereof being raised to an operative position.
Figure 6:
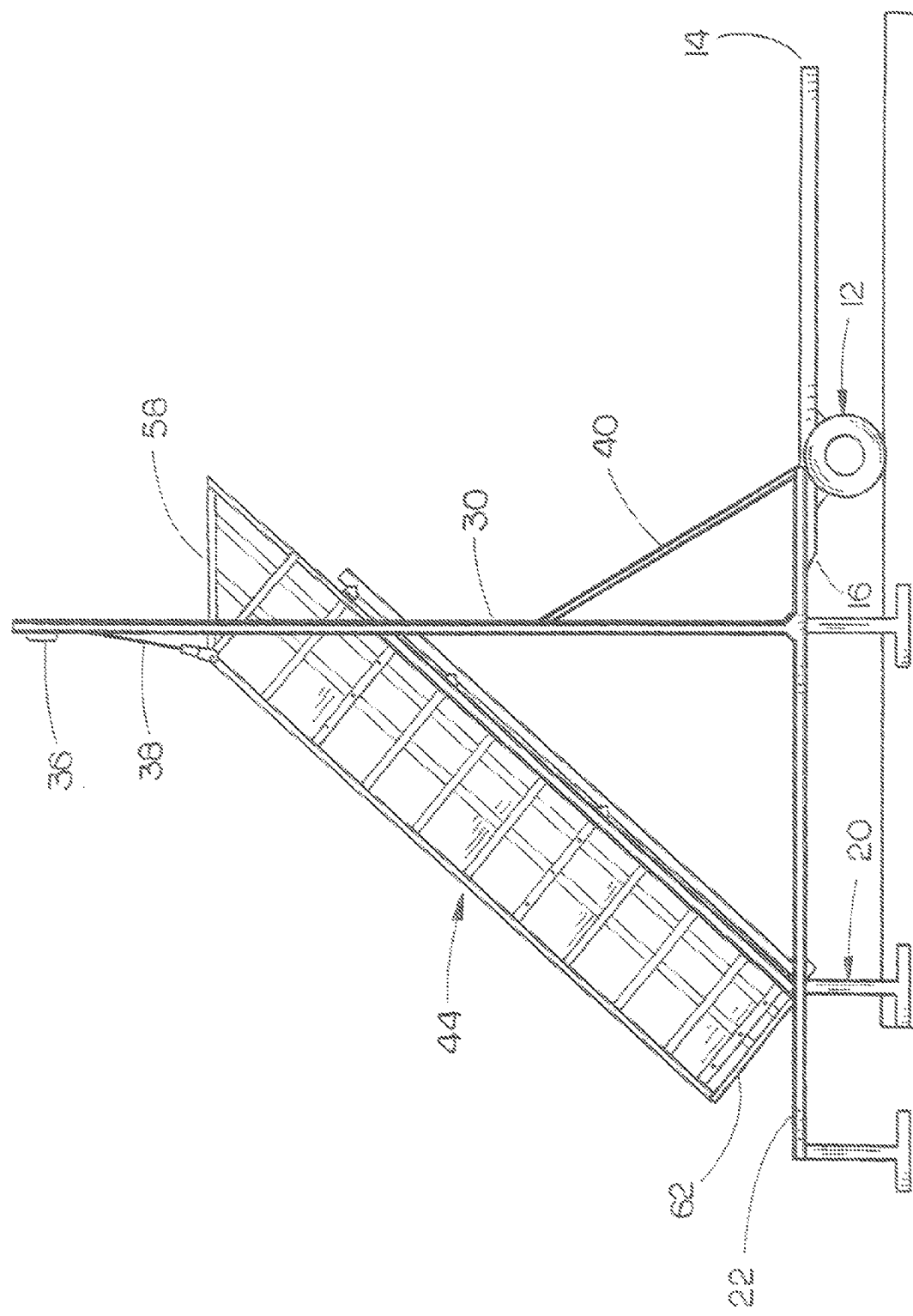
FIG. 6 is a side view of the reactor with the container portion thereof being raised to an operative position.

Structural stand 18 includes a pair of horizontally disposed support channels 22 and 24 which have transition units or members 26 and 28 provided therein between the ends thereof respectively. The stand 18 also includes a pair of vertically disposed support channels 30 and 32 which are secured to the transition units 26 and 28 respectively and which extend upwardly therefrom. A support beam 34 is secured to the upper ends of support channels 30 and 32 and extends therebetween as seen in FIG. 3. An electric winch 36 is secured to beam 34 and has a winch cable 38 extending therefrom.

Figure 1:
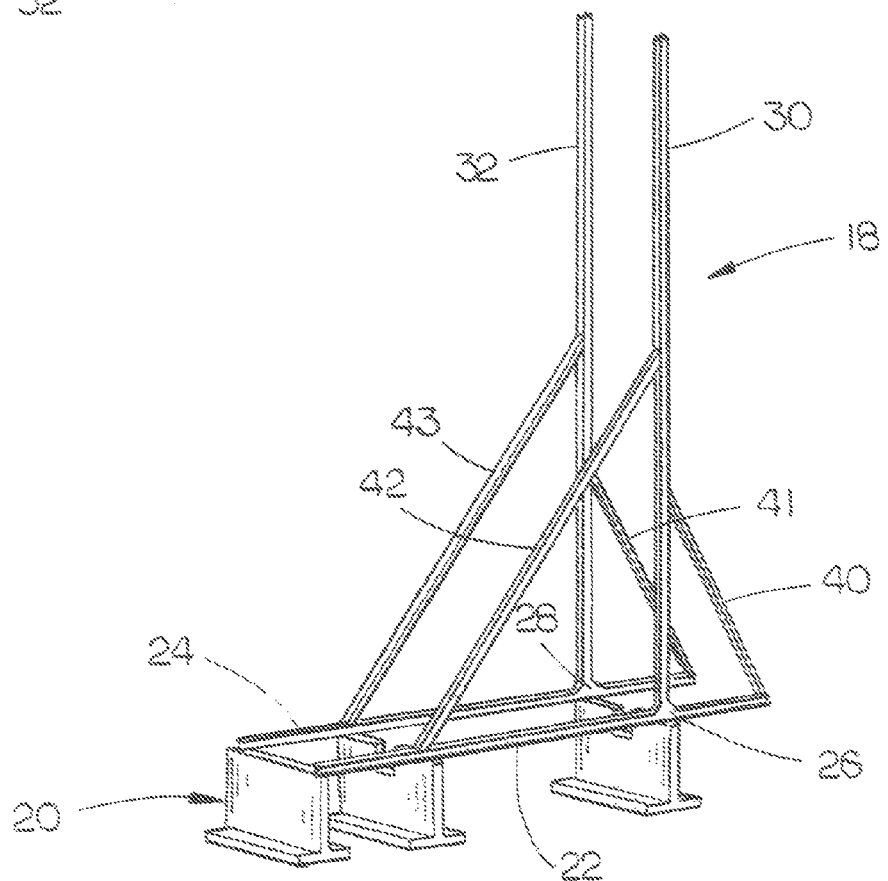
FIG. 1 is a perspective view of the structural stand of this invention.

Brace 40 is secured to support channel 30 and support-channel 22 and extends therebetween as seen in FIGS. 1 and 3. Brace 41 is secured to support channel 32 and support channel 24 and extends therebetween as seen in FIG. 1. Brace 42 is secured to support channel 30 and support channel 22 and extends therebetween as seen in FIGS. 1 and 3. Brace 43 is secured to support channel 32 and support channel 24 and extends therebetween as seen in FIGS. 1 and 3.

Preferably, the various components of the support stand 18, namely horizontal support channels 22, 24, vertical support channels 30 and 32, and braces 40, 41, 42 and 43 are selectively secured together by bolts or the like so that the structural stand 18 may be assembled and disassembled so that it may be readily transported in a disassembled condition from one composting location to another. If the structural stand 18 is to be a permanent fixture, the various components thereof may be welded or otherwise secured together.

Figure 12:
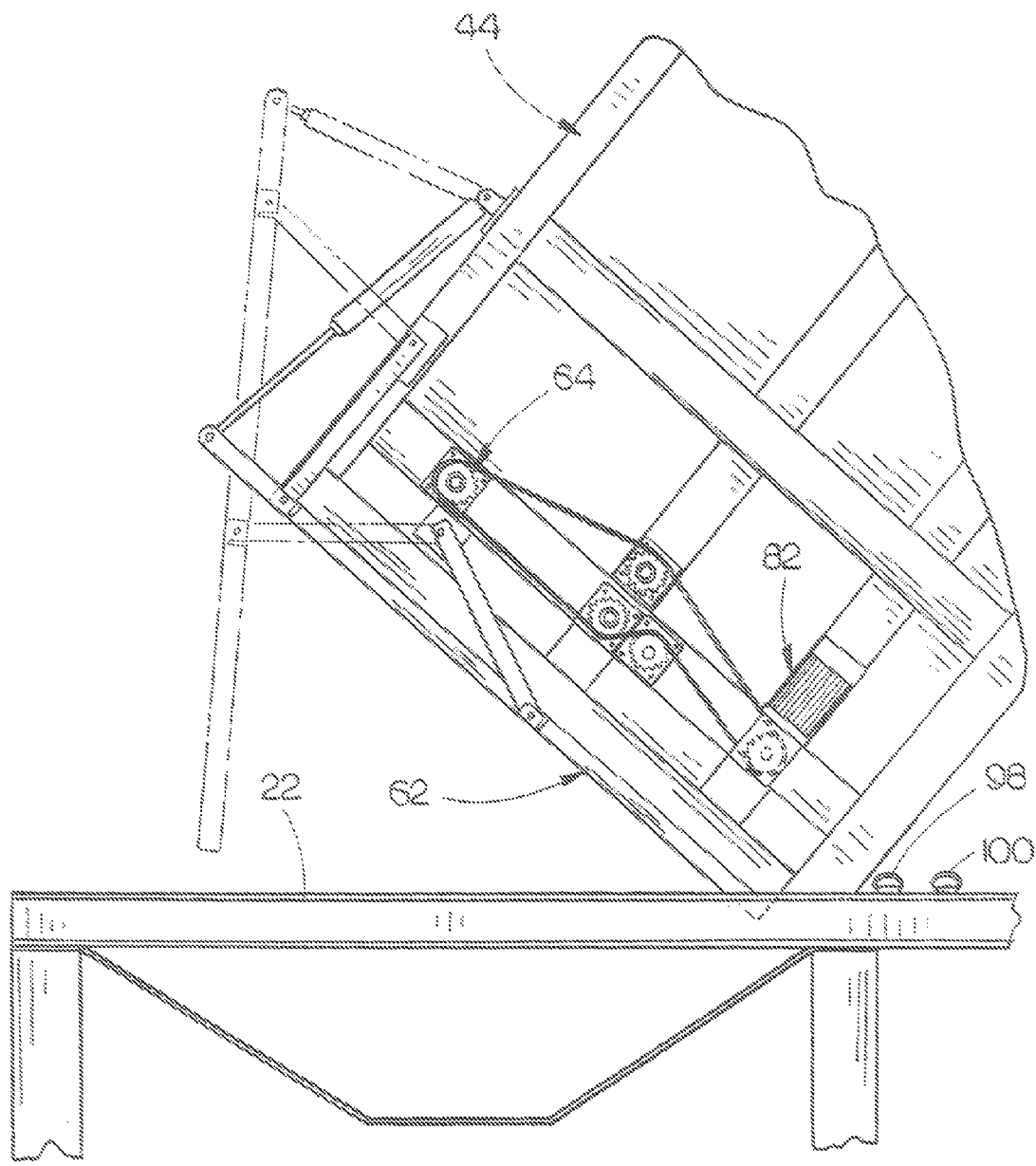
FIG. 12 is a partial side view of the lower end of the container which illustrates the discharge door in a closed position with the broken lines illustrating the discharge door in an open position.

In addition to the structural stand 18 and the support structure 20, the reactor 10 includes an elongated container or vessel 44 having a top wall 46, side walls 48 and 50 and bottom wall or floor 52. Container 44 has a closable fill (upper) opening 54 and a closable discharge (lower) opening 56. A container hood 58 selectively closes the fill opening 54 (FIGS. 13 and 14) as will be described in greater detail hereinafter. Hood 58 has a process air exhaust outlet 60 provided thereon. A discharge door 62 selectively opens and closes the discharge opening 56 (FIG. 12) as will also be described in greater detail hereinafter.

Figure 7:
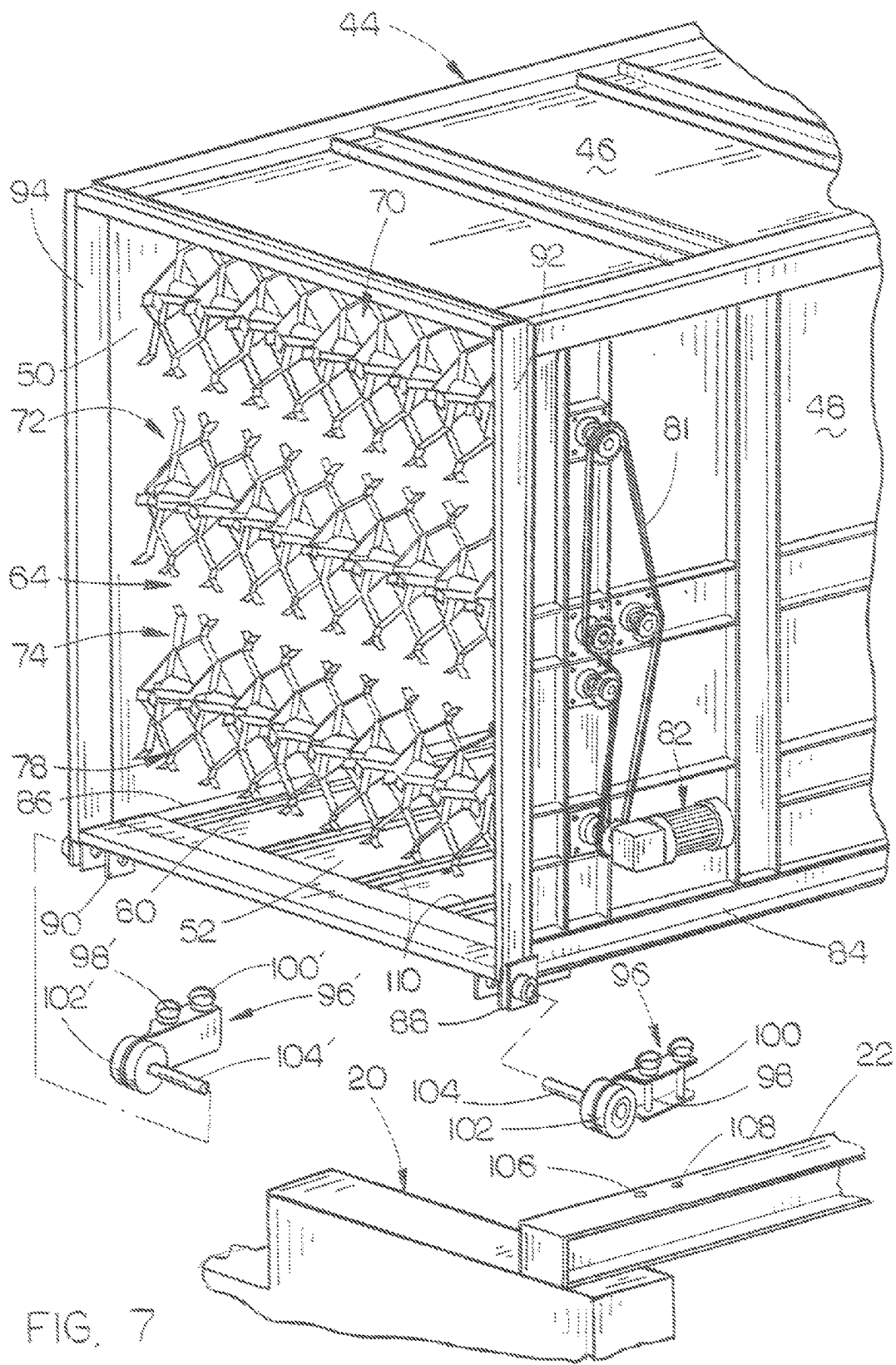
FIG. 7 is a partial exploded perspective view of the discharge end of the container and associated structure.
Figure 8:
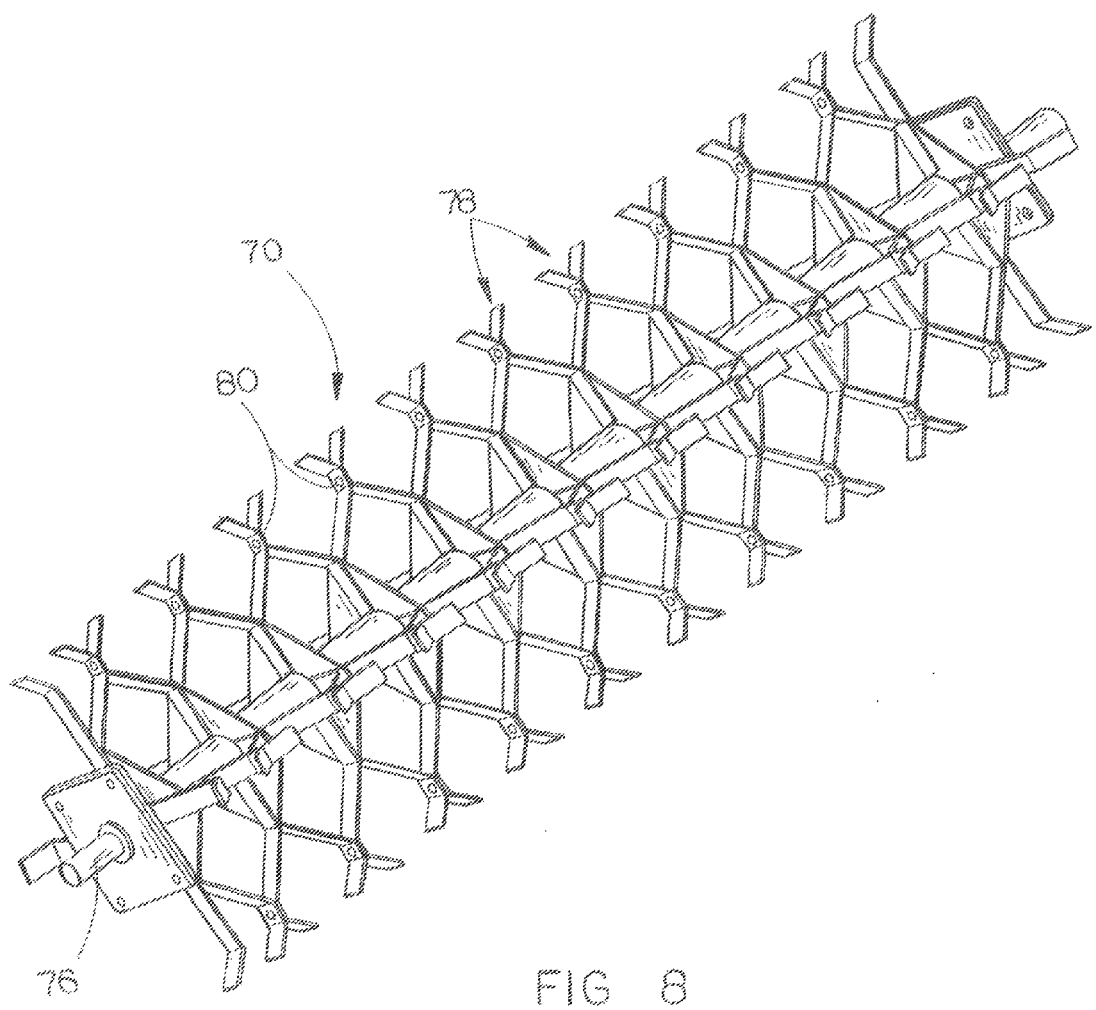
FIG. 8 is a perspective view of one of the rotors of this invention.
Figure 9:
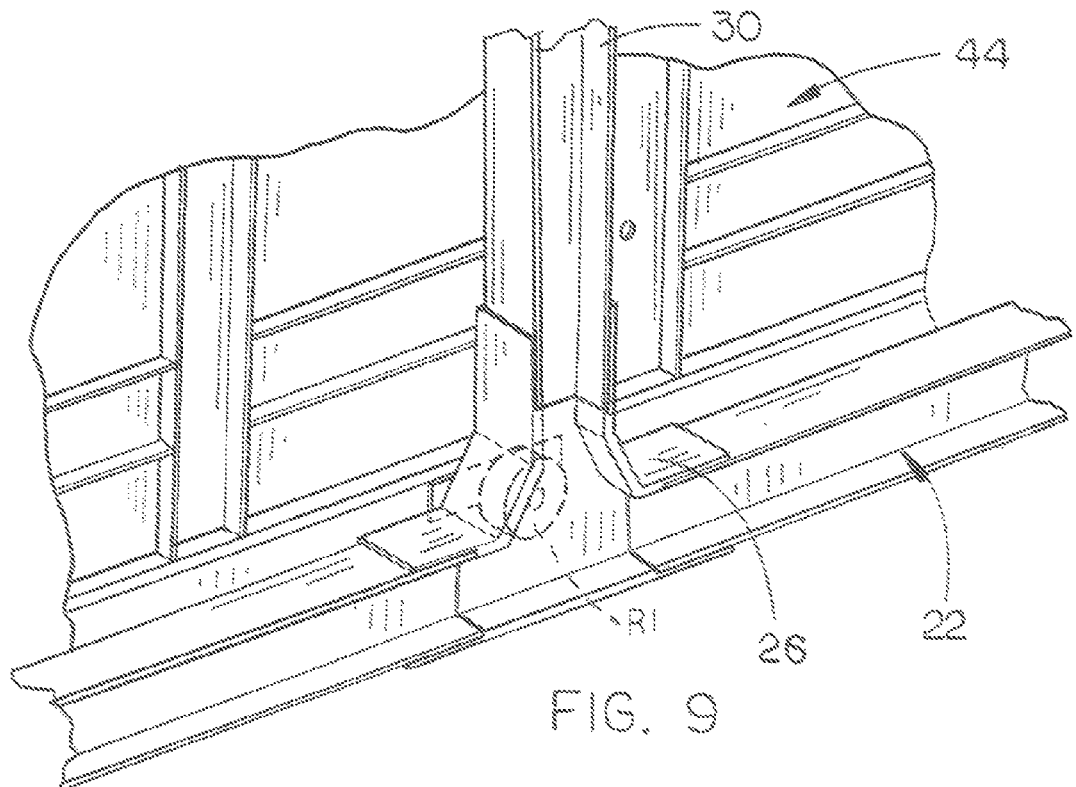
FIG. 9 is a partial perspective view illustrating the transition unit between the horizontal support I-beam channel and the vertical support I-beam channel.
Figure 10:
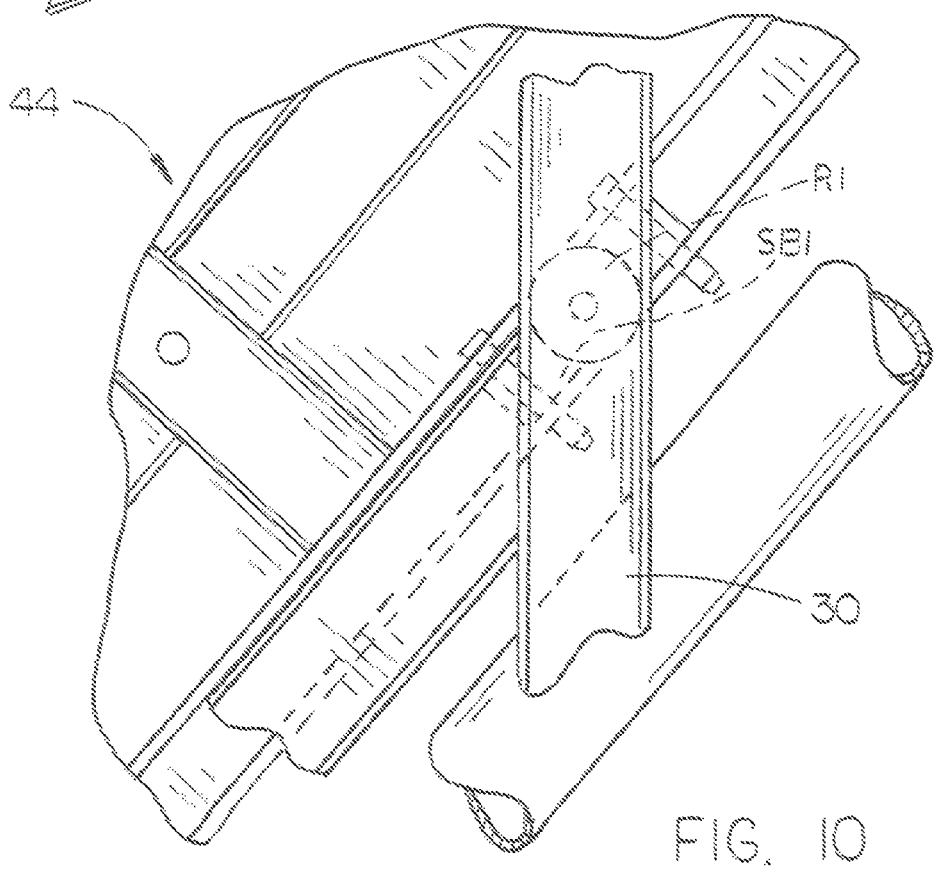
FIG. 10 is a partial perspective view illustrating one of the slider blocks at the upper end of the container.
Figure 11:
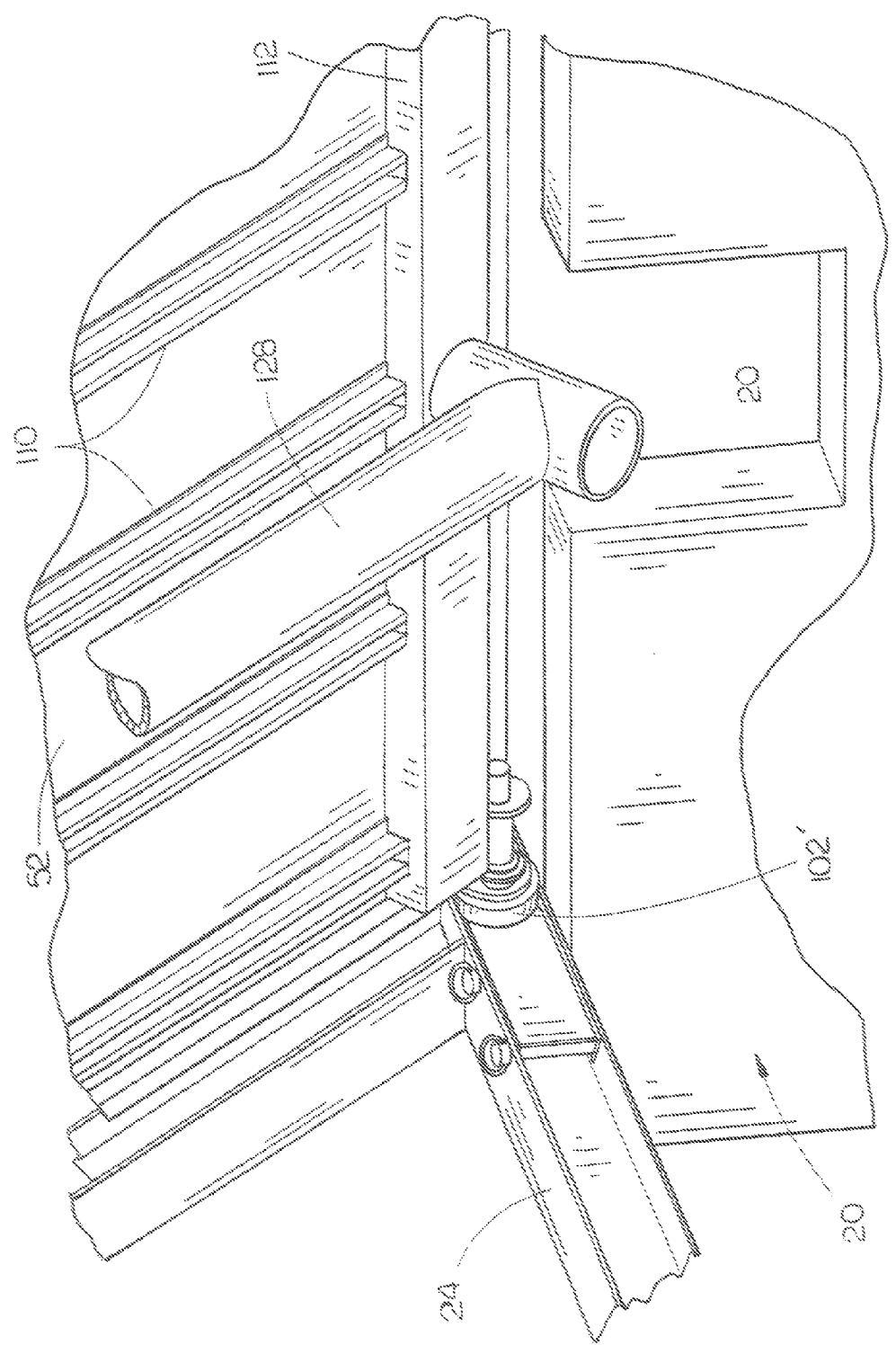
FIG. 11 is a partial perspective view illustrating one of the lower sliding block assemblies.
Figure 16:
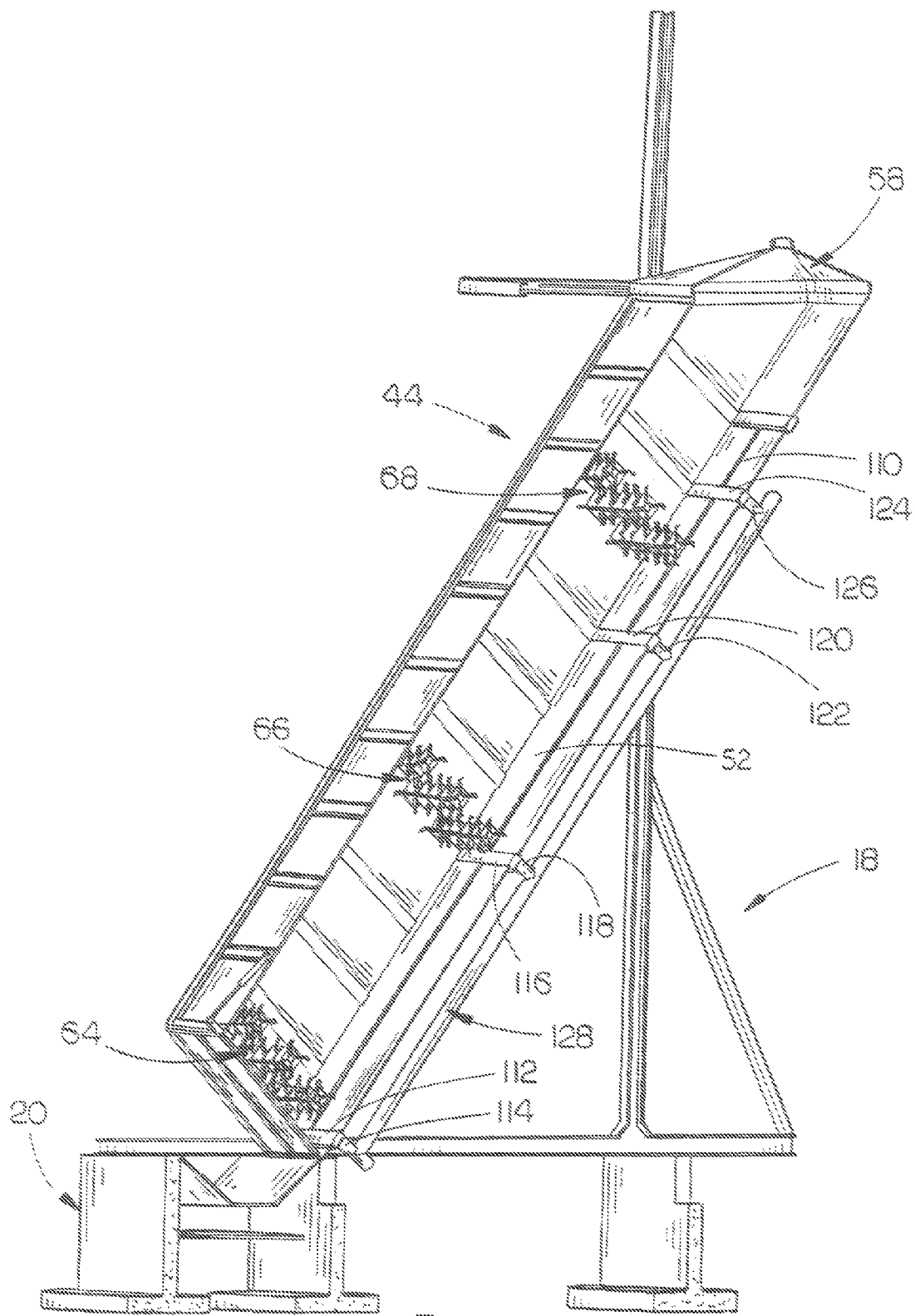
FIG. 16 is a longitudinal cut-away view of the container of this invention in an operative position.

Rotor assemblies 64, 66 and 68 are positioned within container 44 in a spaced-apart manner (FIG. 16). Although three rotor assemblies are disclosed, the container 44 could have any number of rotor assemblies mounted therein. Inasmuch as the rotor assemblies 64, 66 and 68 are identical, only rotor assembly 64 will be described in detail. Rotor assembly 64 includes three spaced-apart rotors 70, 72 and 74 (FIG. 7). Inasmuch as rotor 70, 72 and 74 are identical, only rotor 70 will be described in detail. Rotor 70 includes a central driven shaft 76 having a plurality of radially-spaced tine assemblies 78 secured thereto which extend (FIG. 8) therefrom. Each of the tine assemblies 78 includes a plurality of generally X-shaped tines 80 which are arranged in an end-to-end manner as seen in FIG. 8.

The ends of the driven shafts of the rotors 70, 72 and 74 extend outwardly through side walls 48 and 50 with the ends which extend through side wall 48 being interconnected by a drive chain 81. The rotors 70, 72 and 74 are driven by an electric gear motor or hydraulic motor 82 as seen in FIG. 7.

Container 44 has an elongated C-shaped channel members 84 and 86 at the lower ends of side walls 48 and 50 respectively. Container 44 has support brackets 88 and 90 at the lower ends of channel members 92 and 94 which are positioned at the discharge end of side walls 48 and 50 respectively as seen in FIG. 7.

The numeral 96 refers to a slider block which is slidably received in the inner side of the I-beam support channel 22 and which has a pair of locking pins 98 and 100 associated therewith. Roller 102 is mounted on slider block 96 and has an axle 104 extending therefrom which is rotatably or pivotally received by support bracket 88. The numeral 96' refers to a slider block which is attached to support bracket 90 and which is slidably received in the outer side of the I-beam support channel 24. Slider block 96' has a pair of locking pins 98' and 100' associated therewith. Roller 102' is mounted on slider block 96' and has an axle 104' extending therefrom which is rotatably or pivotally received by support bracket 90. Each of the support channels 22 and 24 have openings 106 and 108 formed therein adapted to receive the locking pins 98, 100 and 98' and 100' respectively.

An upper slider block SB1 having a roller R1 is selectively longitudinally movably positioned on the support channel 22 and which may be locked in place by the locking pins associated therewith. An upper slider block (not shown) is selectively longitudinally positioned on the support channel 24 and which may be locked in place by the locking pins associated therewith.

The floor 52 of the container 44 has a plurality of longitudinally extending aeration strips 110 mounted thereon which extend between the ends of the container 44 (FIG. 16). A transversely extending air distribution member 112 is positioned beneath the floor 52 below rotor 64 and is in communication with the aeration strips 110 to supply air process air thereto. A damper 114 is positioned at the center of the distribution member 112 to control the flow of air to the member 112.

A transversely extending air distribution member 116 is positioned beneath the floor 52 below rotor 66 and is in communication with the aeration strips 110 to supply process air thereto. A damper 118 is positioned at the center of distribution member 116 to control the flow of process air to the member 116.

A transversely extending air distribution member 120 is positioned beneath the floor 52 which is in communication with the aeration strip 110 between rotors 66 and 68 as seen in the drawings. A damper 122 is connected to the center of the member 120 to control the flow of air to the member 120.

A transversely extending air distribution member 124 is positioned beneath floor 52 between the rotor assembly 68 and the upper end of the container 44 to supply air thereto. A damper 126 is positioned at the center of the distribution member 124 to control the flow of air to the member 124. The positioning of the distribution member 124 creates a first aeration zone inlet. The positioning of distribution member 120 creates a second aeration zone inlet. The positioning of distribution member 116 creates a third aeration zone inlet. The positioning of distribution member 112 creates a fourth aeration zone inlet. Although four aeration zones are shown, any number of aeration zones could be provided.

An elongated process air supply manifold 128 interconnects the members 112, 116, 120 and 124 through the dampers associated therewith to supply process air thereto. The lower end of process air supply manifold 128 is connected to a conventional blower to supply air under pressure to the interior of the container 44. The multiple aeration zones of varying lengths allow different optimal oxygen, temperature and moisture removal rates at various stages of the process.

The gravity assisted reactor 10 requires its own unique stand 18 and structural support 20 to allow the raising and lowering of the container 44 from its functional position while rigidly securing the unit at an angle with respect to the horizontal during process operations as described above. Different combinations of input process materials may require different angular relationships for optimal transport rates along the length of the container 44; therefore, this same support allows the container 44 to be positioned at different angles to accommodate the various bulk densities and moisture contents of multiple raw material inputs.

Figure 13:
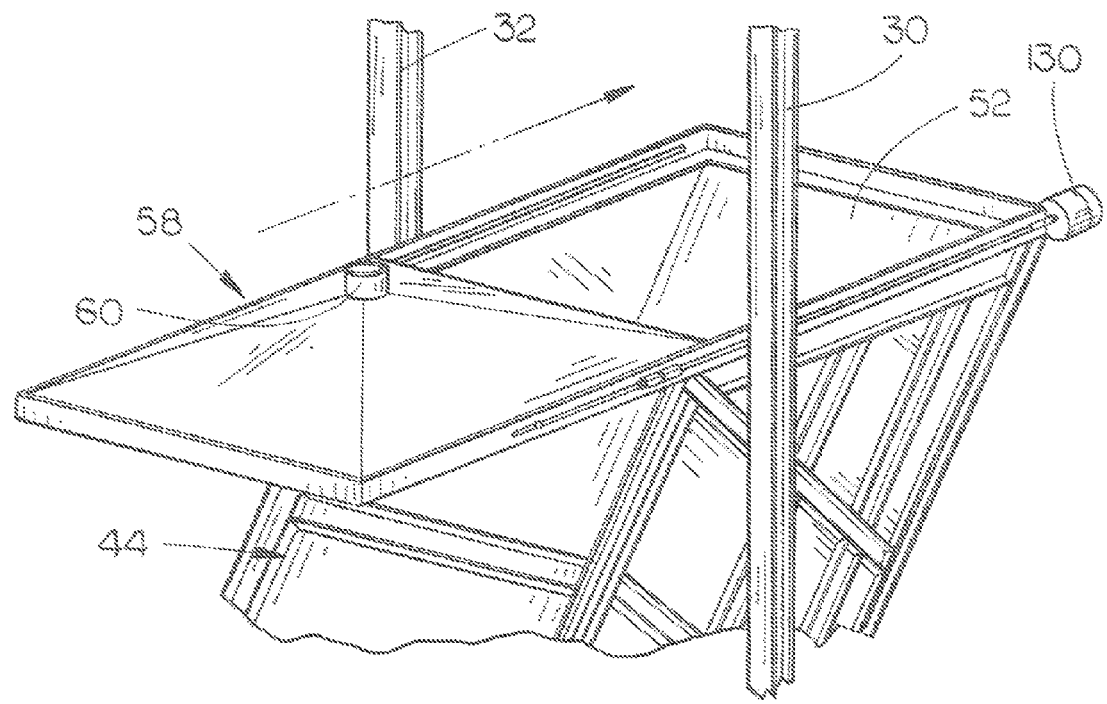
FIG. 13 is a partial perspective view illustrating the hood at the upper end of the container in its open position.
Figure 14:
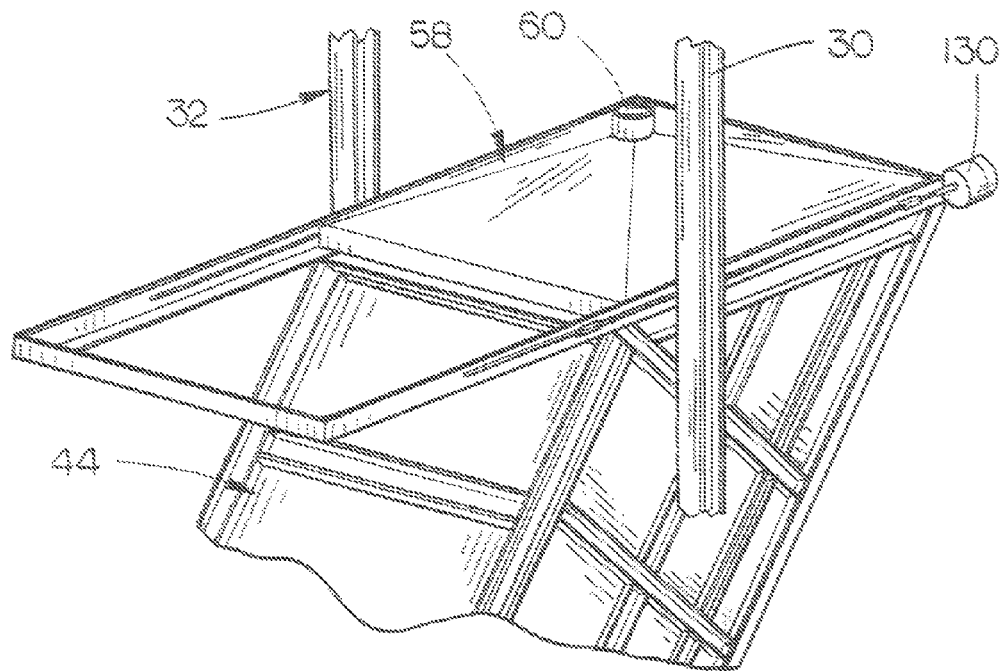
FIG. 14 is a view similar to FIG. 13 except that the hood has been moved to its closed position.

Because the gravity assisted reactor 10 operates at a significant angle with respect to the horizontal, and potentially over a range of angles at a given site, the reactor 10 has unique fill and discharge requirements. The fill end cover (or container hood 58) is capable of being drawn to a fully open position at an elevation of 30-40 feet above its base elevation in all weather conditions and under an automated or remote control system. Furthermore, the discharge port 60 from the hood 58 must remain connected to an air duct that transports the exhaust air to an odor control device such as a biofilter. One possible configuration is the sliding hood 58 operated by a lead screw drive 130 as seen in FIGS. 13 and 14.

The discharge end door 62 is capable of interfacing, without interference, with various methods of removing the discharged material. Among these methods is the use of various types of conveyors or bucket loaders in removing the material after it has been dropped from the discharge end 56 of the container 44.

In operation, support structure 20 will be provided at the site of composting. The structural span 18 will be supported on the support structure 20 as set forth above. The truck or trailer having the container 44 thereon will be backed up to the support structure 20 and unloaded from the truck or trailer. The container 44 will be positioned on the structural stand so that the rollers 102 and 102 are received within the horizontal support channels 22 and 24 respectively.

The container 44 is moved along the horizontal support channels 22 and 24 until the rollers on the upper slider blocks register with the transition units 26 and 28. At that time, if not already done so, the winch cable 38 will be attached to the upper end of the container. The locking pins 98, 100, 98' and 100' will be inserted into the openings formed in channels 22 and 24. The winch 36 will then be operated to raise the upper end of the container 44 upwardly on the support channels 30 and 32 with the rollers on the upper slider blockings being movably received by the channels on the inner sides of support channels 30 and 32.

When the desired angle of container 44 has been achieved, the winch 36 is stopped. At that time, the upper slider blocks may be locked in place to maintain that angle during the operation of the compost reactor. The discharge door 62 is then closed and the hood 56 opened. The material to be composted is conveyed or otherwise delivered to the open upper end of container 44.

The material will slide down the floor 52 of the container 44. The rotors 64, 66 and 68 may be actuated to control the rate of flow of the material and to agitate the same to enhance a uniform composting action. Process air is blown through the manifold 128 and into the members 112, 116, 120 and 124 which defines the process air to the members 110.

In summary, the floor 52 of the container 44 is equipped with the aeration floor components that allow air to be introduced under the base of the material passing through the container. The air is drawn through the process material under negative pressure and travels against the flow of the material eventually exiting through the "fill end" of the container 44. The container 44 has multiple aeration zones of varying length that allow different optimal oxygen, temperature and moisture removal rates at various stages of the process.

Air under pressure is drawn into the reactor at the base of the supply air manifold 128. Any water, (i.e., leachate) that is drained or produced from the biological action of the process material flows by gravity from the base of each aeration zone and is transferred by the supply air manifold down to the base of the reactor. As the process air leaves the top of the hood 58, it is collected in a process air exhaust duct (manifold) through which the air travels to an odor blower and subsequently to an odor control device such as a filter. Since the exhausted air may be at a temperature exceeding the desirable upper temperature limit for entrance into a biofilter, pressure may be introduced into the air exhaust duct.

Figure 15:
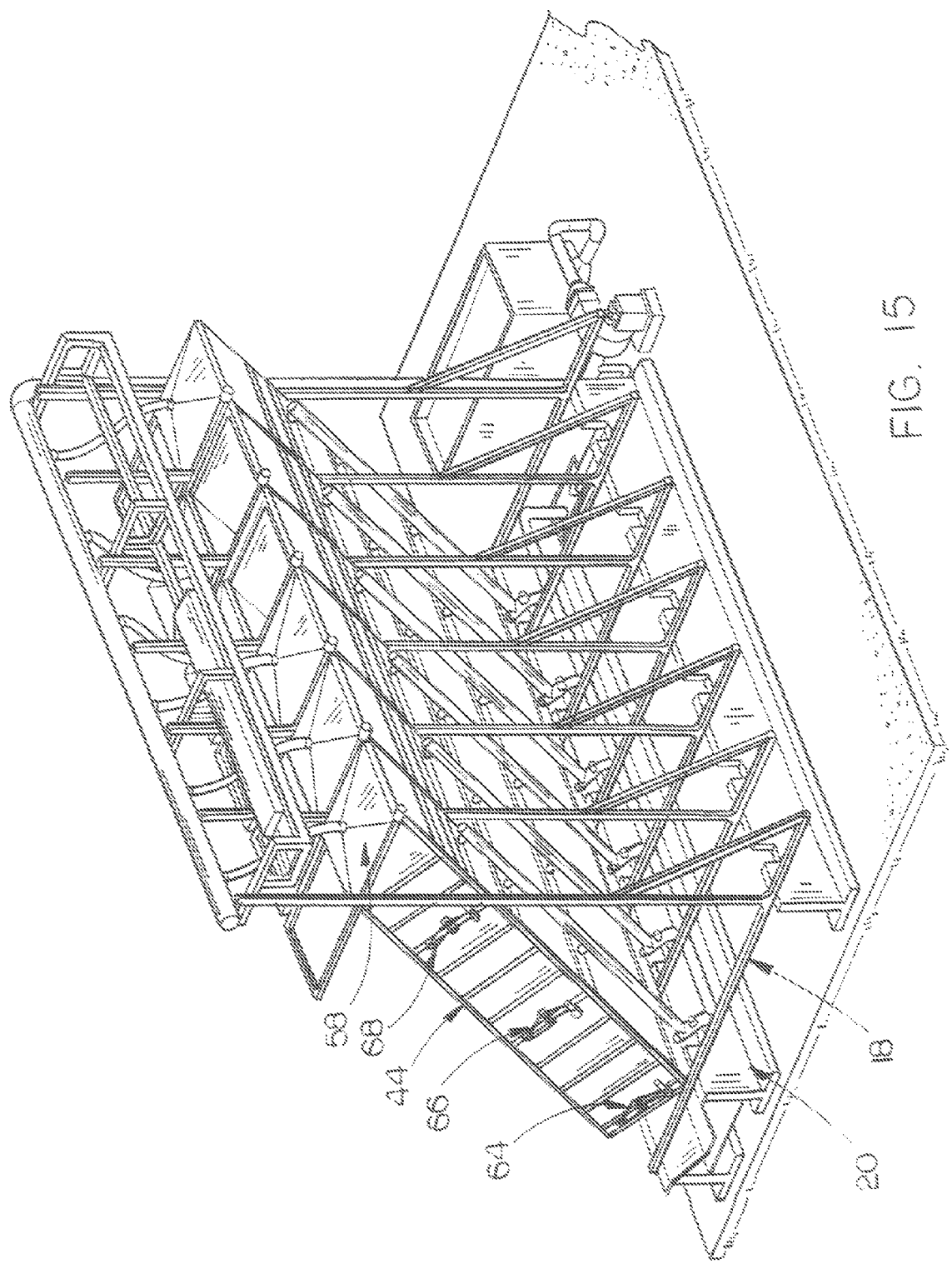
FIG. 15 is a perspective view illustrating a plurality of the reactors of this invention being mounted in a side-by-side manner.

The composting system of this invention utilizes gravity and natural thermal convection to provide a compact, modular, plug-flow compost reactor which requires minimal aeration and agitation energy. FIG. 15 illustrates a situation wherein several of the reactors are positioned in a side-byside relationship. The compost reactor of this invention is modular and is easily transported from place to place and may be installed in a side-by-side relationship with other identical reactors.

The modularity of the system of this invention enables a compost facility to be quickly installed and readily expanded. The modularity of not only the reactor unit but also the support stand structure allows a facility to be readily disassembled and moved.

The angular position of the reactor, the ability to mount duct work under the container, and the ability to mount material-handling equipment, (i.e., conveyors) directly above the opened "fill end" of the container and partially under the discharge end of the container significantly reduces the overall footprint of a compost facility compared to virtually all other composting systems. The angular placement of the container 44 offers greater maintenance and servicing accessibility to all equipment components compared to most vertical compost units.

The same features that offer a minimal footprint enable a compost facility comprised of gravity assisted reactor units to be constructed with minimal site infrastructure requirements. All functions are self-contained; only condensate-leachate emissions need to be contained, disposed or recycled. In most cases, only electrical service is required at the site.

The utilization of gravity in transporting the material downward through the container 44 reduces the energy associated with either moving or agitating the process material as is the case with other processes. Agitation is accomplished by the rotor assemblies but only for short intervals over a 24-hour period.

Within the container 44, a thermal profile will exist in which the highest temperature zone is at the top of the container 44 followed by a profile of reducing temperatures along the downward slope of the container. This creates a "chimney" effect that draws air upwardly through the material and reduces the external energy required to move the air. The ability to introduce fresh air into the process at several points along the length of the container 44 enables the parameters of oxygen and temperature to be maintained in a narrow range over the process path of the material with natural convection being the principal driving force creating the air intake. Since the greatest oxygen demand is in the earliest stages of the compost process and the greatest demand for air to cool the process is also near the "fill end" of the container 44, the cumulative impact of increasing the air flow within the process material from the discharge end to the fill end ideally matches these process requirements.

As previously stated, the agitation cycles are only for short duration and occur only to discharge material from the container or to maintain continuity of material between discharge cycles. During discharge of material from the container 44, any or all rotors are activated to move the material downwardly along the slope of the reactor container. During occasional periods between material discharge periods, any or all rotors can be activated for short periods to re-distribute material or prevent formation of cavities inside the process material due to shrinkage from biodegradation.

The design features of the rotors are unique in that they serve multiple purposes to include: (1) to control movement of the material downward along the slope of the container; (2) to agitate the material and expose new material surfaces to biological degradation; and (3) to prevent the downward sliding of the process material during operational periods when material discharge is not desired. The rotor of this invention has sufficient open area to allow material to pass over the central shaft and through the spaces between the tines. At the same time, the tines are sufficiently closed to prevent material from passing through the rotor while the rotor is stationary.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:

1. A compost reactor for organic matter, said reactor comprising:
    a support structure including a horizontally disposed frame, having first and second ends, and an upstanding frame, having upper and lower ends, extending upwardly from said horizontally disposed frame;
    an elongated hollow housing having a floor, a pair of oppositely disposed side walls, a top wall, an upper end, and a lower end;
    said upper end of said housing being in communication with a source of organic matter;
    said housing being mounted on said support structure whereby said upper end of said housing is operatively vertically movably secured to said upstanding frame and said lower end of said housing is operatively movably secured to said horizontally disposed frame whereby the angle of said housing, with respect to horizontal, may be selectively varied;
    a winch operatively secured to the upper end of the support structure, said winch having a winch cable secured to said housing at the upper end of the housing;
    a plurality of flow control and material agitator assemblies positioned in said housing in a longitudinally spaced-apart manner;
    each of said flow control and material agitator assemblies capable of controlling the flow of organic matter through each assembly and capable of agitating the organic matter adjacent to each assembly;
    said housing having a plurality of spaced-apart aeration zones;
    a process air supply which supplies process air to each of said aeration zones;
    a hood selectively closing said upper end of said housing; said hood having a process air exhaust outlet; and
    a discharge door selectively closing said lower end of said housing.

2. The compost reactor of claim 1 wherein said each of said flow control and material agitator assembly comprises a plurality of horizontally disposed and spaced-apart rotatable rotors.

3. The compost reactor of claim 1 wherein said process air is introduced into said housing through said floor of said housing.

4. The compost reactor wherein a plurality of support structures are provided in a side-to-side manner and wherein a housing is mounted on each of said support structures.

5. The compost reactor of claim 1 wherein an in-feed conveyor supplies organic matter to said upper end of said housing.

6. The compost reactor of claim 1 wherein a discharge conveyor is in communication with said lower end of said housing.

7. The compost reactor of claim 1 wherein said hood is powered between open and closed positions.

8. The compost reactor of claim 1 wherein said discharge door is powered between open and closed positions.

9. A compost reactor for organic matter, said reactor comprising:
- a support structure;
- a structural stand positioned on said support structure;
- said structural stand comprising:
  - (a) a first horizontally disposed frame member having first and second ends;
  - (b) a second horizontally disposed frame member, having first and second ends, which is horizontally spaced from said first horizontally disposed frame member;
  - (c) a first vertically disposed frame member, having upper and lower ends, secured to said first horizontally disposed frame member and which extends upwardly from said first horizontally disposed frame member;
  - (d) a second vertically disposed frame member, having upper and lower ends, secured to said second horizontally disposed frame member and which extends upwardly from said second horizontally disposed frame member;
- a winch operatively secured to said upper ends of said first and second vertically disposed frame members;
- said winch having a winch cable extending from said winch;
- an elongated hollow housing, having open upper and lower ends;
- said housing including a floor, upstanding first and second side walls, and a top wall;
- said housing having a first elongated beam, having first and second ends, at the lower end of said first side wall of said housing;
- said housing having a second elongated beam, having first and second ends, at the lower end of said second side wall of said housing;
- a first slide block secured to said first end of said first beam;
- a second slide block secured to said first end of said second beam;
- said first slide block being slidably movably mounted on said first elongated beam;
- said second slide block being slidably mounted on said first end of said second elongated beam;
- said first beam having a first roller assembly secured thereto which extends laterally therefrom intermediate said first and second ends of said first beam;
- said second beam having a second roller assembly secured thereto which extends laterally therefrom intermediate said first and second ends of said second beam;
- said first and second roller assemblies being in movable engagement with said first and second vertically disposed frame members respectively;
- said winch cable being secured to said housing at the upper end of said housing;
- the retraction of said winch cable by said winch causing said first and second roller assemblies to move upwardly along said first and second vertically disposed frames respectively and causing said first and second slide blocks to move along said first and second beams respectively so that the upper end of said housing may be elevated above said lower end of said housing.

10. The compost reactor of claim 9 wherein said winch is operable to change the angle of said housing.

11. The compost reactor of claim 9 wherein said slide blocks include locking devices to lock said slide blocks to said beams.

12. The compost reactor of claim 9 further including spaced-apart rotor assemblies positioned in said housing in a spaced-apart manner.

13. The compost reactor of claim 9 wherein a hood selectively closes said open upper end of said housing.

14. The compost reactor of claim 9 wherein a discharge door selectively closes said open lower end of said housing.

* * * * *